United States Patent
Takagi et al.

(10) Patent No.: US 10,163,550 B2
(45) Date of Patent: Dec. 25, 2018

(54) SUPERCONDUCTING CABLE AND SUPERCONDUCTING CABLE MANUFACTURING METHOD

(71) Applicant: FURUKAWA ELECTRIC CO., LTD., Tokyo (JP)

(72) Inventors: Tomohiro Takagi, Tokyo (JP); Masashi Yagi, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/672,502

(22) Filed: Aug. 9, 2017

(65) Prior Publication Data

US 2017/0372819 A1 Dec. 28, 2017

Related U.S. Application Data

(63) Continuation of application No. PCT/JP2016/052748, filed on Jan. 29, 2016.

(30) Foreign Application Priority Data

Feb. 10, 2015 (JP) ................................. 2015-024416

(51) Int. Cl.
*H01B 17/36* (2006.01)
*H01B 12/14* (2006.01)
(Continued)

(52) U.S. Cl.
CPC ............ *H01B 12/14* (2013.01); *H01B 12/04* (2013.01); *H01B 12/16* (2013.01); *H02G 15/34* (2013.01); *Y02E 40/647* (2013.01); *Y02E 40/648* (2013.01)

(58) Field of Classification Search
CPC ........ H01B 12/14; H01B 12/04; H01B 12/16; H01B 12/00; H01B 12/02; H02G 15/34;
(Continued)

(56) References Cited

U.S. PATENT DOCUMENTS

| 8,037,705 | B2* | 10/2011 | Schmidt | ................ | H01B 12/02 |
| | | | | | 174/125.1 |
| 8,275,430 | B2* | 9/2012 | Schmidt | ................ | H02G 15/34 |
| | | | | | 174/125.1 |

(Continued)

FOREIGN PATENT DOCUMENTS

| JP | 46-20456 | 6/1971 |
| JP | 2010-187520 | 8/2010 |

(Continued)

OTHER PUBLICATIONS

Written Opinion dated Apr. 19, 2016 in PCT/JP2016/052748, filed on Jan. 29, 2016.

(Continued)

*Primary Examiner* — Angel R Estrada
(74) *Attorney, Agent, or Firm* — Oblon, McClelland, Maier & Neustadt, L.L.P.

(57) ABSTRACT

In order to obtain a highly versatile superconducting cable capable of absorbing differences in thermal contraction amounts that arise between three members, these being a cable core, an inner tube, and an outer tube, and to obtain a superconducting cable manufacturing method of the same, a superconducting cable includes a thermal insulation vacuum tube and a cable core. The thermal insulation vacuum tube includes an inner tube fixed at both ends and having a cooling medium filled inside, and an outer tube disposed at an outer peripheral side of the inner tube with a space between the outer tube and the inner tube maintained at a vacuum, and is configured to include a winding section wound with one or more turns. The cable core is fixed at both ends and disposed inside the inner tube.

20 Claims, 9 Drawing Sheets

(51) Int. Cl.
*H01B 12/16* (2006.01)
*H01B 12/04* (2006.01)
*H02G 15/34* (2006.01)

(58) Field of Classification Search
CPC ...... H02G 15/20; H02G 15/23; Y02E 40/647;
Y02E 40/648
USPC .... 174/8, 9 R, 125.1, 68.1, 34, 36; 505/430,
505/887, 230, 234
See application file for complete search history.

(56) References Cited

U.S. PATENT DOCUMENTS

| | | | | |
|---|---|---|---|---|
| 8,748,747 B2* | 6/2014 | Soika | ................... | H01B 12/02 |
| | | | | 174/125.1 |
| 8,946,125 B2* | 2/2015 | Yagi | ..................... | H02G 15/34 |
| | | | | 505/430 |

FOREIGN PATENT DOCUMENTS

| JP | 2010-272529 | 12/2010 |
|---|---|---|
| JP | 2013-143823 | 7/2013 |

OTHER PUBLICATIONS

International Search Report dated Apr. 19, 2016 in PCT/JP2016/052748, filed on Jan. 29 2016 ( with English Translation).
Written Opinion dated Apr. 19, 2016 in PCT/JP2016/2016/052748, filed on Jan. 29, 2016.

* cited by examiner

SUPERCONDUCTING CABLE AND SUPERCONDUCTING CABLE MANUFACTURING METHOD

CROSS-REFERENCE TO RELATED APPLICATION

This application is a continuation application of International Application No. PCT/JP2016/052748, filed Jan. 29, 2016, the disclosure of which is incorporated herein by reference in its entirety. Further, this application claims priority from Japanese Patent Application No. 2015-024416, filed Feb. 10, 2015, the disclosure of which is incorporated herein by reference in its entirety.

FIELD

The present invention relates to a superconducting cable and superconducting cable manufacturing method.

BACKGROUND

A known superconducting cable has a configuration in which a cable core is laid at the inside of a thermal insulation vacuum tube including an inner tube and an outer tube, and the cable core is cooled by flowing a cooling liquid inside the inner tube. As an example of such a superconducting cable, a configuration is described in Japanese Patent Application Laid-Open (JP-A) No. 2010-187520 in which an outer tube and a cable end section are coupled together by a bellows tube. Moreover, thermal contraction of the outer tube during cooling is absorbed by extension and contraction of the bellows tube. Moreover, a configuration in which plural cable cores are twisted together inside an inner tube is described in JP-A No. 2010-272529. Thermal contraction of the cable cores during cooling is, moreover, absorbed by the provision of slack in twisting of the cable cores.

However, the technology described in JP-A No. 2010-187520 is only disposed in the vicinity of cable end sections. Hence, thermal contraction in an intermediate portion between one cable end section and the other cable end section is not able to be absorbed, leading to cases in which load is placed on the cable. Moreover, the technology described in JP-A No. 2010-272529 proposes a configuration in which plural cable cores are provided, and therefore application is not possible to a superconducting cable provided with a single cable core, and so the technology has low versatility. Moreover, there is also room for improvement in absorbing differences in the amount of thermal contraction arising between three members, these being the cable core, the inner tube, and the outer tube.

SUMMARY

In consideration of the above circumstances, an object of the present invention is to obtain a superconducting cable capable of absorbing differences in the amount of thermal contraction arising between the three members of a cable core, an inner tube, and an outer tube, and a superconducting cable manufacturing method of the same.

A superconducting cable of a first aspect includes: a thermal insulation vacuum tube including an inner tube fixed at both ends and having a cooling medium filled inside, and an outer tube disposed at an outer peripheral side of the inner tube with a space between the outer tube and the inner tube maintained at a vacuum, and configured to include a winding section wound with one or more turns; and a cable core fixed at both ends and disposed inside the inner tube.

In the superconducting cable of the first aspect, the thermal insulation vacuum tube includes the inner tube and the outer tube, with both ends of the inner tube and the outer tube fixed. The inside of the inner tube is filled with cooling medium. Moreover, the space between the inner tube and the outer tube is maintained at a vacuum. The cable core is disposed at the inside of the inner tube, and both ends of the cable core are also fixed. The thermal insulation vacuum tube includes a winding section wound with one or more turns. The cable core is also wound together with the thermal insulation vacuum tube. Thus when the cooling medium is filled inside the inner tube, the cable core in the winding section undergoes greater thermal contraction than the inner tube, and tensile stress arises. In particular, the cable core normally includes many locations configured from polymer materials which contract more than metals, and so when the inner tube is made from metal, the cable core undergoes greater thermal contraction and a tensile stress is large. The cable core moves in the radial direction inside the inner tube in a direction to approach the central axis of the winding section (winding central axis). Moreover, due to the inner tube being cooled more than the outer tube in the winding section, the inner tube undergoes greater thermal contraction than the outer tube and moves in a radial direction inside the outer tube in the direction to approach the axis of the winding section. In this manner, the cable core and the inner tube extend out at both sides of the winding section by amounts commensurate with the decrease in their winding diameters, absorbing tensile stress. As a result, a difference in thermal contraction amounts between the cable core and the inner tube, and a difference in thermal contraction amounts between the outer tube and the inner tube, can be absorbed, enabling stress loading on the cable to be reduced.

Moreover, due to being able to form plural winding sections a given position, a long extension amount of the cable core and the inner tube can be secured by merely increasing the number of turns of the winding section.

A superconducting cable of a second aspect is the first wherein the winding section is wound around the outer periphery of a winding frame.

In the superconducting cable of the second aspect, the winding structure of the cable overall can be suppressed from deforming even in cases in which the cable core and the inner tube have moved in the radial direction of the outer tube during thermal contraction so as to approach the winding central axis of the winding section. Namely, this enables the shape of the superconducting cable in the winding section to be well maintained.

A superconducting cable of a third aspect is the first aspect or the second aspect, wherein in a state prior to the cooling medium being filled inside the inner, tube, the inner tube in the winding section is disposed eccentrically to a central axis of the outer tube in a direction away from a winding central axis of the winding section.

In the superconducting cable of the third aspect, a large amount of movement can be secured for when the inner tube moves in the outer tube radial direction as it thermally contracts when the cooling medium has been filled inside the inner tube. This enables the differences in thermal contraction amounts to be absorbed with good efficiency.

A superconducting cable of a fourth aspect is any one aspect of the first aspect to the third aspect, wherein, in a state in which the cooling medium has been filled inside the inner tube, the inner tube in the winding section is disposed eccentrically to a central axis of the outer tube in a direction to approach a winding central axis of the winding section.

In the superconducting cable of the fourth aspect, for example interference between the inner tube and the outer tube can be suppressed, even in cases in which the inner tube, which thermally expanded when the cooling medium filled inside the inner tube was removed, moves in the direction away from the winding central axis of the winding section. This enables damage to the inner tube and the outer tube to be suppressed when the cooling medium has been removed.

A superconducting cable of a fifth aspect is any one aspect of the first aspect to the fourth aspect, wherein, in a state prior to the cooling medium being filled inside the inner tube, the cable core in the winding section is disposed eccentrically to central axis of the inner tube in a direction away from a winding central axis of the winding section.

In the superconducting cable of the fifth aspect, a large amount of movement can be secured for the inner tube radial direction movement of the cable core that has thermally contracted when the cooling medium was filled inside the inner tube. This enables the differences in thermal contraction amounts to be absorbed with good efficiency.

A superconducting cable of a sixth aspect is any one aspect of the first aspect to the fifth aspect, wherein, in a state in which the cooling medium has been filled inside the inner tube, the cable core in the winding section is disposed eccentrically to a central axis of the inner tube in a direction to approach a winding central axis of the winding section In the superconducting cable of the sixth aspect, for example, interference between the cable core and the inner tube can be suppressed, even in cases in which the cable core, which thermally expanded when the cooling medium filled inside the inner tube was removed, moves in the direction away from the winding central axis of the winding section. This enables damage to the cable core and the inner tube to be suppressed when the cooling medium has been removed.

A superconducting cable of a seventh aspect is any one aspect of the first aspect to the sixth aspect, wherein a diameter of the cable core is φ40 mm or less.

In the superconducting cable of the seventh aspect, a shorter superconducting cable suffices to form the winding section due to the diameter of the cable core being φ40 mm or less. Namely, as a rule of thumb, the minimum permissible bending diameter of a cable core is generally approximately 25 times the cable core diameter, and the larger the diameter of the cable core, the larger the minimum permissible bending diameter becomes. Thus, in cases in which the diameter of the cable core is greater than φ40 mm, the winding diameter of the winding section would preferably be greater than φ1 m, requiring a longer length of superconducting cable to form the winding section, and raising the cost. In contrast thereto, the winding diameter of the winding section can be made smaller due to the diameter of the cable core being φ40 mm or less, enabling the cost to be reduced. Note that the minimum permissible bending diameter for a cable core as recommended by the International Council on Large Electric Systems (CIGRE) is 25×(d+D)+ 5%, wherein D is the outer diameter of a thermal insulation vacuum tube, and d is the diameter of the cable core. Note that in cases in which a corrugated tube (wavy-profile tube) is employed for the thermal insulation vacuum tube, due to bending more readily than the cable core, the minimum permissible cable bending diameter may be set solely in consideration of the cable core that bends the least readily.

A superconducting cable of an eighth aspect is any one aspect of the first aspect to the seventh aspect, wherein a winding diameter of the thermal insulation vacuum tube having a smallest winding diameter in the winding section is 1 m or less.

In the superconducting cable of the eighth aspect, due to forming a compact winding section with a winding diameter of φ1 m or less, there is no need for a long superconducting cable to form the winding section, enabling the cost to be reduced.

A superconducting cable of an ninth aspect is any one aspect of the first aspect to the eighth aspect, wherein the number of turns of the winding section is 20 turns or less.

In the superconducting cable of the ninth aspect, the cable core is able to be pulled out from the winding section efficiently when the cable core has thermally contracted. Namely, in cases in which the number of winding turns is more than 20, the total amount of friction that occurs between the inner wall of the tube on the outside of the winding section and the surface of the structural body at the inside increases, and so sometimes not all the extension amount of the inner tube and the cable core is able to be pulled out. In such cases, not only does the winding structure in the vicinity of the center of the winding section not fulfill its intended role, but there is also an increase in cost and space. In contrast thereto, the total amount of friction is less due to the number of winding turns being 20 turns or less, and radial direction movement between the inner tube and the outer tube of the thermal insulation vacuum tube of comparatively small friction is smooth. This enables the inner tube and the cable core to be pulled out from the winding section efficiently and a difference in thermal contraction amount to be absorbed.

A superconducting cable of a tenth aspect is any one aspect of the first aspect to the ninth aspect, wherein at least one end of the cable core is disposed in a liquid tank of cooling medium provided at a cable end section, and the at least one end of the cable core includes a core winding section wound with one turn or more inside the liquid tank.

In the superconducting cable of the tenth aspect, the core winding section extends like a tensile spring when the cable core thermally contracts, enabling the tensile stress acting at the vicinity of the cable end section to be absorbed.

A method of manufacturing a superconducting cable according to an eleventh aspect is a method including: a cable laying process of, between a pair of cable end sections, laying a cable core, an inner tube that is disposed at an outer peripheral side of the cable core, and an outer tube that is disposed at an outer peripheral side of the inner tube and that has a space between the outer tube and the inner tube maintained at a vacuum; a winding process of winding one turn or more of the cable core, the inner tube, and the outer winding frame; and a cooling medium feed process of flowing the cooling medium inside the inner tube in a state in which both ends of the cable core, the inner tube, and the outer tube are fixed to the cable end sections.

In the superconducting cable manufacturing method of the eleventh aspect, in the cable laying process, the cable core, the inner tube, and the outer tube are laid between a pair of cable end sections. In the winding process, one turn or more of the cable core, the inner tube, and the outer tube is wound around a winding frame to form a winding section. Then, in the cooling medium feed process, the cable core and the inner tube in the winding section move in the radial direction of the outer tube so as to approach the winding central axis of the winding section due to the cooling medium being fed inside the inner tube. The cable core and the inner tube accordingly extend at both sides of the winding section, enabling tensile stress acting on the cable core and the inner tube to be absorbed.

A superconducting cable manufacturing method of a twelfth aspect is the eleventh aspect, wherein, in the cooling medium feed process, in a state prior to flowing the cooling medium inside the inner tube, the inner tube is disposed eccentrically to a central axis of the outer tube in a direction away from a winding central axis, and the cable core is disposed eccentrically to a central axis of the inner tube in a direction away from the winding central axis.

In the superconducting cable manufacturing method of the twelfth aspect, a large amount of movement can be secured for the inner tube and the cable core that have thermally contracted when the cooling medium was flowed inside the inner tube in the cooling medium feed process. This enables the difference in thermal contraction amounts to be absorbed with good efficiency thereby.

As described above, the superconducting cable according to the present invention has highly versatility, and enables a difference in thermal contraction amounts between three members, these being the cable core, the inner tube, and the outer tube, to be absorbed.

DESCRIPTION OF EMBODIMENTS

First Exemplary Embodiment

A description follows regarding a first exemplary embodiment of a superconducting cable according to the present invention, with reference to FIG. 1 to FIG. 4.

Configuration of Superconducting Cable and Cable End Section

Figure 1:
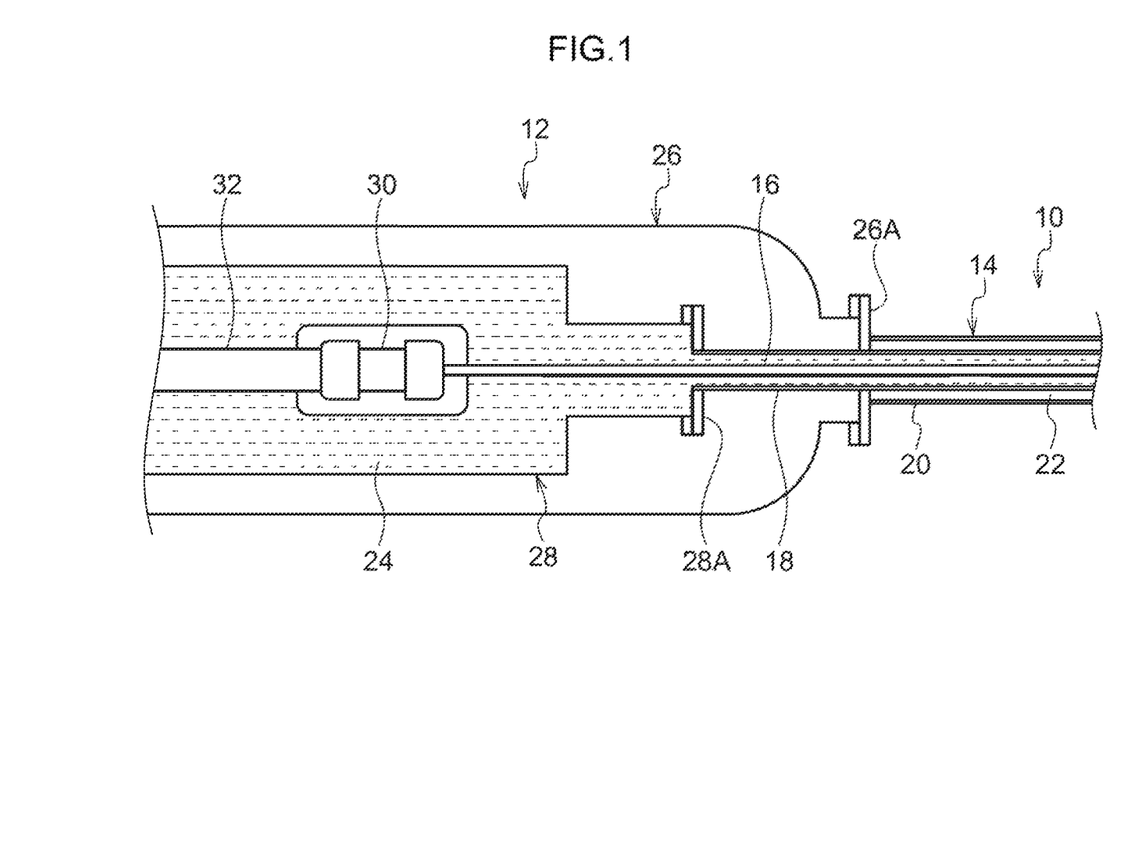
FIG. 1 is a diagram schematically illustrating a cross-section of a cable end section of a superconducting cable according to a first exemplary embodiment.

As illustrated in FIG. 1, a superconducting cable 10 according to the present invention is configured mainly including a thermal insulation vacuum tube 14, and a cable core 16. The thermal insulation vacuum tube 14 is configured including an inner tube 18 and an outer tube 20.

The inner tube 18 is a substantially cylindrical shaped member formed by a corrugated tube (wavy-profile tube). One end of the inner tube 18 is connected (fixed) to a cable end section 12. Liquid nitrogen 24 is filled into the inside of the inner tube 18 as a cooling medium. As an example, the inner tube 18 employed in the present exemplary embodiment has an inner diameter of φ29 mm and an outer diameter of φ33 mm.

The outer tube 20 is a substantially tube shaped member formed by a corrugated tube and disposed at the outer peripheral side of the inner tube 18. One end portion of the outer tube 20 is connected (fixed) to the cable end section 12. A space 22 between the outer tube 20 and the inner tube 18 is maintained at a vacuum. As an example, the outer tube 20 employed in the present exemplary embodiment has an inner diameter of φ48 mm, and an outer diameter of φ54 mm. Note that the level of vacuum of the space 22 between the outer tube 20 and the inner tube 18 is not particularly limited, as long as it is a level of vacuum obtaining a sufficient thermal insulation effect.

The cable core 16 is disposed at the inside of the inner tube 18. The cable core 16 is, for example, configured by winding a large number of strands of a tape shaped superconducting wire, not illustrated in the drawings, in a helical shape around a former, not illustrated in the drawings, the former being formed from a metallic material having excellent electrical conductivity (for example, copper). An insulating layer, not illustrated in the drawings, a superconductor shield layer, not illustrated in the drawings, and a protection layer, not illustrated in the drawings, are then provided thereon. One end portion of the cable core 16 is connected (fixed) to the cable end section 12. The cable care 16 employed in the present exemplary embodiment has a diameter of φ40 mm or less, and, as an example, the cable core 16 employed has a diameter of φ24 mm.

The cable end section 12 includes an outer pressure chamber 26 configuring at outer shell. A flange 26A is provided at one end portion of the outer pressure chamber 26. The outer tube 20 of the thermal insulation vacuum tube 14 is connected to the outer pressure chamber 26, and the space 22 between the outer tube 20 and the inner tube 18 is closed off by the flange 26A.

The inner tube 18 extends into the interior of the outer pressure chamber 26, and is connected to a flange 28A of a liquid tank 28 disposed inside the outer pressure chamber 26. Liquid nitrogen is filled inside the liquid tank 28 as a cooling medium, such that the liquid nitrogen can be fed inside the inner tube 18 from the liquid tank 28.

A connection terminal 30 is provided at the inside of the liquid tank 28. One end portion of the cable core 16 is connected to an end on one side of the connection terminal 30. A lead conductor 32 is connected to an end of the connection terminal 30 on the other side. The lead conductor 32 extends out to the exterior of the cable end section 12.

Configuration of Winding Section

Figure 2:
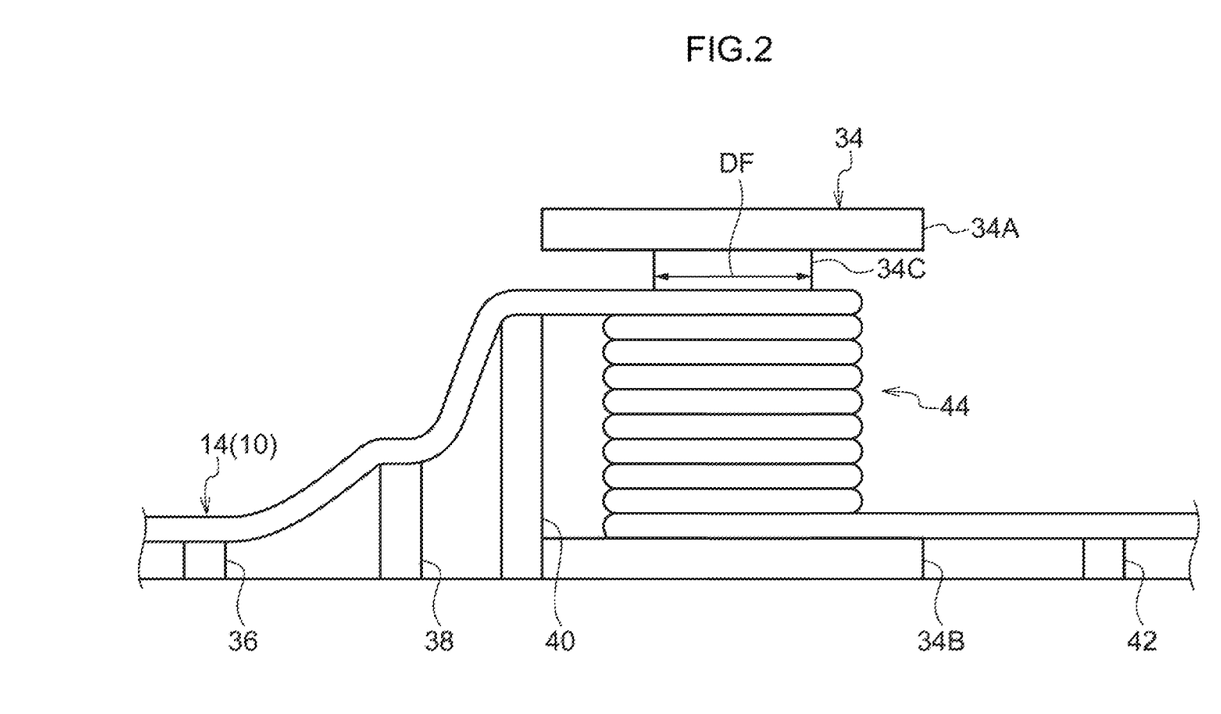
FIG. 2 is a side view of a winding section of a superconducting cable according to the first exemplary embodiment, as viewed from the side.

Another end portion of the inner tube 18, another end portion of the outer tube 20, and another end portion of the cable core 16 are connected (fixed) to another cable end section, not illustrated in the drawings. A winding section 44 where the thermal insulation vacuum tube 14 and the cable core 16 have been wound is provided between the one cable end section 12 and the other cable end section, as illustrated in FIG. 2.

The winding section 44 is configured by winding one or more turns of the thermal insulation vacuum tube 14 and the cable core 16. As an example, the thermal insulation vacuum tube 14 of the present exemplary embodiment wound ten turns around the outer peripheral face of a winding frame 34. The winding frame 34 includes a substantially circular column shaped frame body 34C. The thermal insulation vacuum tube 14 is wound around the outer peripheral face of the frame body 34C. An upper flange 34A of larger diameter than the frame body 34C is provided at an upper end portion of the frame body 34C. A lower flange 34B formed with substantially the same diameter as the upper flange 34A is provided at a lower end portion of the frame body 34C.

In the present exemplary embodiment the winding section 44 is formed such that the thermal insulation vacuum tube 14 forms a helical shape along an up-down direction, and support stands 36, 38, 40 are disposed so as to support the thermal insulation vacuum tube 14 in a structure in which the thermal insulation vacuum tube 14 is lifted up to the upper end portion of the winding section 44. A support stand 42 is also provided in consideration of the height difference between the lower end portion of the winding section 44 and the lower flange 34B.

The frame body 34C employed in the winding frame 34 has a diameter of φ1 m or less. As an example, the thermal insulation vacuum tube 14 of the present exemplary embodiment is wound around the outer peripheral face of the frame body 34C having a diameter of φ0.6 m. The winding diameter of the thermal insulation vacuum tube 14 having the smallest winding diameter in the winding section 44 is accordingly 1 m or less.

Manufacturing Method

Next, a description follows regarding a method of manufacturing a structure in which the superconducting cable 10 is installed between a pair of the cable end sections 12. First, the cable core 16, the inner tube 18, and the outer tube 20 are laid between the pair of cable end sections 12 (a cable laying process).

Next, the cable core 16, the inner tube 18, and the outer tube 20 are wound one turn or more around the winding frame 34 (a winding process). The winding section 44 is formed thereby. Note that although the winding section 44 may be formed as a single layer, as illustrated in FIG. 2, double layer winding or triple layer winding may also be employed. In such cases, the winding diameter at the innermost winding location in the winding section 44 equates to the smallest winding diameter of the present invention. Namely, the smallest winding diameter is the diameter DF of the frame body 34C of the winding frame 34 in FIG. 2.

After the winding section 44 has been formed, a connection terminal 30 of the cable end section 12 is connected (fixed) to each of both end sections of the cable core 16. Note that the interior of the thermal insulation vacuum tube may be evacuated when this is performed, or may be under vacuum at a prior stage. Both end sections of the inner tube 18 are each connected (fixed) to the liquid tank 28 of the cable end section 12. Moreover, both end sections of the outer tube 20 are connected to the outer pressure chamber 26 of the cable end section 12.

Figure 3A:
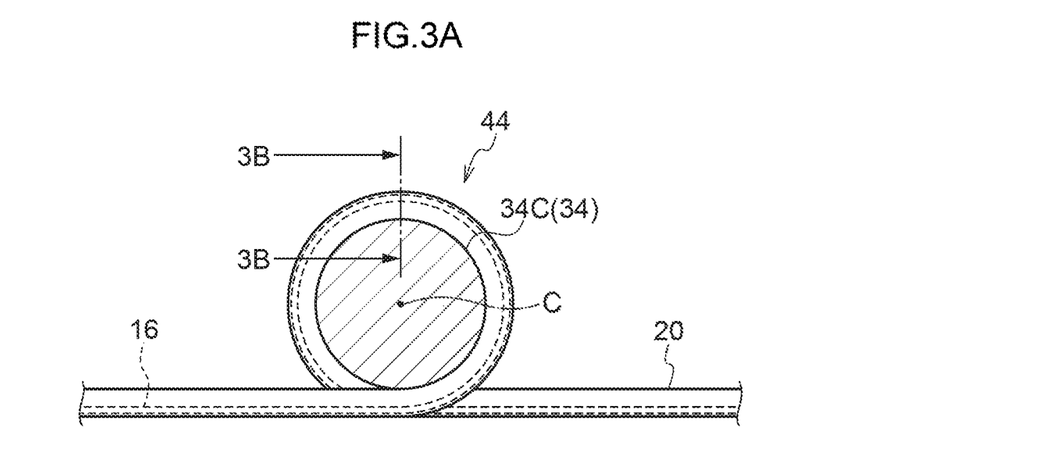
FIG. 3A is a plan view of the winding section of FIG. 2 as viewed from above, and is a diagram illustrating the winding section in a state prior to flowing liquid nitrogen.
Figure 3B:
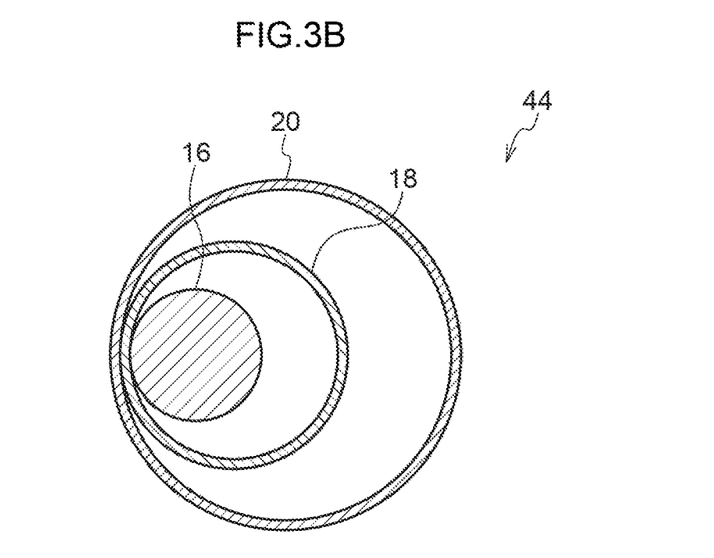
FIG. 3B is a cross-section illustrating a cross-section sectioned on line 3B-3B of FIG. 3A.

As illustrated in FIG. 3A and FIG. 3B, due to the stiffness of the inner tube 18 when forming the winding section 44, the inner tube 18 is laid along the inner peripheral wall at the outside of the outer tube 20. Moreover, due also to the stiffness of the cable core 16 when forming, the winding section 44, the cable core 16 is laid along the inner peripheral wall at the outside of the inner tube 18. Hence, in a state prior to filling the liquid nitrogen 24 inside the inner tube 18, the inner tube 18 is disposed eccentrically to the central axis of the outer tube 20 in a direction away from a center C, and the cable core 16 is disposed eccentrically to the central axis of the inner tube 18 in the direction away from the center C.

Figure 4A:
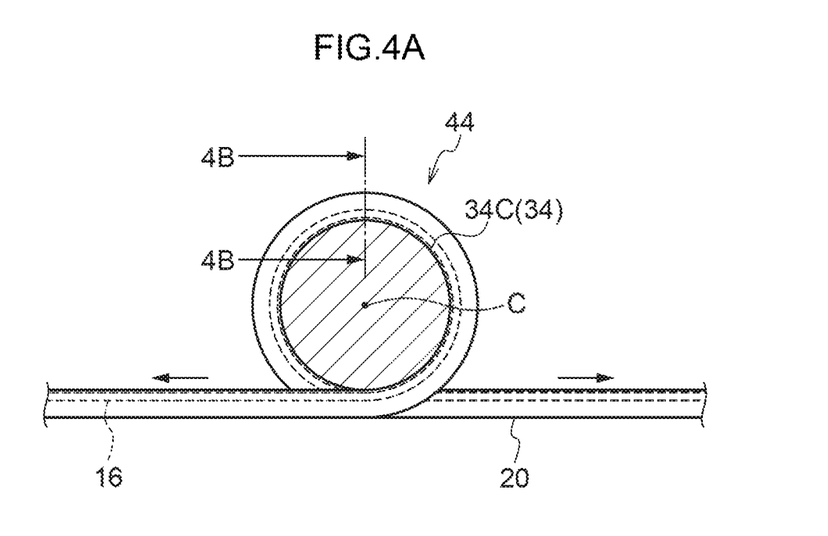
FIG. 4A is a plan view of the winding section of FIG. 2 as viewed from above, and is a diagram illustrating the winding section in a state after liquid nitrogen has flowed.
Figure 4B:
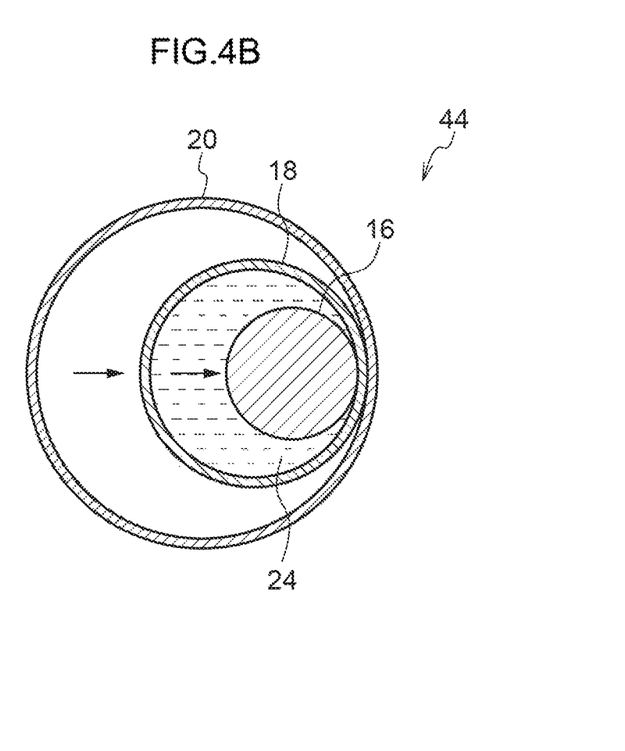
FIG. 4B is a cross-section illustrating a cross-section sectioned on line 4B-4B of FIG. 4A.

In a state in which the winding section 44 has been formed as described above, liquid nitrogen is fed inside the inner tube 18 from the liquid tank 28 of the cable end section 12 (a cooling medium feed process). The cable core 16 and the inner tube 18 are thereby cooled. As illustrated in FIG. 4A, due to the cable core 16 and the inner tube 18 being cooled and undergoing thermal contraction, tensile stress from both sides of the winding section 44 acts thereon. When this occurs in the winding section 44, as illustrated in FIG. 4B, the inner tube 18 moves with respect to the outer tube 20 in the direction to approach the center (winding central axis) C of the winding section 44. The cable core 16 moves with respect to the inner tube 18 in the direction to approach the center C. The inner tube 18 and the cable core 16 accordingly extend at both sides of the winding section 44 and absorb the tensile stress.

Operation and Advantageous Effects

Next, a description follows regarding operation and advantageous effects of the superconducting cable according to the present exemplary embodiment.

According to the present exemplary embodiment, when the liquid nitrogen 24 is fed inside the inner tube 18, the cable core 16 and the inner tube 18 in the winding section 44 are cooled, and move inside the outer tube 20 toward the center C side of the winding section 44. Tensile stress that acts during thermal contraction can be absorbed by the cable core 16 and the inner tube 18 extending at both sides of the winding section 44 by an amount commensurate with their approach in this manner toward the center C of the winding section 44. Namely, differences in the amounts of thermal contraction arising between three members, these being the cable core 16, the inner tube 18, and the outer tube 20, can be absorbed.

The amount of thermal contraction (extension length ΔL) absorbed by the superconducting cable 10 according to the present exemplary embodiment is found by the following Equation (1).

$$\Delta L = \pi (D_{outer} - D_{inner}) * n \qquad \text{Equation (1)}$$

In Equation (1), $D_{outer}$ is a gap outer peripheral diameter, and $D_{inner}$ is a gap inner peripheral diameter. Namely, to find the extension length of the inner tube 18 with respect to the outer tube 20, the inner diameter of the outer tube 20 is employed as $D_{outer}$, and the outer diameter of the inner tube 18 is employed as $D_{inner}$. In this example, as described above, the outer tube 20 has dimensions of an inner diameter of φ48 mm and an outer diameter of φ54 mm, and the inner tube 18 has dimensions of an inner diameter of φ29 mm and an outer diameter of φ33 mm. The thermal contraction absorption amount (extension length) of the inner tube 18 is accordingly 47.1 mm for each turn, and since there are ten turns in the present exemplary embodiment, the extension length is approximately 47 cm.

Since the diameter of the cable core 16 is φ24 mm, the extension length of the cable core 16 is 62.8 mm for each turn, and since there are ten turns in the present exemplary embodiment, the extension length is approximately 63 cm. Hence, for example, in a case in which a power transmission cable having a total length 1 km is divided into five segments, and the winding section 44 is provided at each of the four segment break locations, the total extension length of the cable core 16 is approximately 2.5 m, and tensile stress can be absorbed equivalent to a length that is 0.25% of the total length of the 1 km power transmission cable.

Moreover, in the present exemplary embodiment, winding section 44 may be formed at any given position in order to absorb thermal contraction by forming the winding sections 44. Moreover the present exemplary embodiment is highly versatile due to being able to increase the thermal contraction absorption amount merely by increasing the number of turns of the winding section 44. There is also no need to change the shape or the like of the winding frame 34, since the number of turns of the winding section 44 can be increased according to the length of the superconducting cable 10 to be laid.

Furthermore, the winding frame 34 is provided in the present exemplary embodiment, and the superconducting cable 10 is wound around the winding frame 34. Thus, even in cases in which the cable core 16 and the inn tube 18 have undergone thermal contraction and have moved in the direction to approach the center C of the winding section 44, deformation of the winding structure of the cable overall can be suppressed. This enables the shape of the thermal insulation vacuum tube and the cable core in the winding section 44 to be well maintained.

Moreover, the amount of movement of the cable core 16 and the inner tube 18 in the radial direction can be increased by disposing the cable core 16 and the inner tube inner tube 8 as illustrated in FIG. 3B in a state prior to feeding the liquid nitrogen 24. This enables the differences in thermal contraction amounts to be absorbed with good efficiency even with a small number of turns.

Moreover, in the present exemplary embodiment, by using the small diameter cable core 16 having as diameter of φ40 mm or less, the winding section 44 can be made compact, and an increase in cost can be suppressed. Namely, in cases in which the diameter of the cable core 16 is large, the minimum permissible bending diameter is also large. For example, were the diameter of the cable core 16 to be 40 mm, then the winding diameter of the winding section 44 would preferably be set to 1 m or greater. Due to the winding diameter of the winding section 44 (the diameter of the frame body 34C) not being related to the extension length, as expressed by above Equation (1), the thermal contraction amount absorption does not change even in cases in which the winding diameter is large. Namely, by making the diameter of the cable core 16 φ40 mm or less, the length of the superconducting cable 10 required to form the winding section 44 can be shortened despite the thermal contraction absorption amount being the same.

Moreover, in addition, in the present exemplary embodiment, the cable core 16 can be drawn out from the winding section 44 during thermal contraction efficiently due to the number of turns of the winding section 44 being 20 turns or less. Namely, the greater the number of turns of the winding section 44, the larger the total amount of friction that occurs between the cable core 16 and the inner tube 18. If this friction were to exceed the tensile stress during thermal contraction then the cable core 16 would not move. In contrast thereto, by making the number of turns 20 turns or less, the friction is comparatively small, there is smooth movement in the radial direction between the inner tube 18 and the outer tube 20 of the thermal insulation vacuum tube 14, and movement out from the winding section 44 can be achieved. However, in cases in which the number of turns is greater than 20, an excessive length of superconducting cable 10 would be needed to be prepared in order to form the winding sections 44, and this is not desirable from the cost perspective.

Second Exemplary Embodiment

Next, a description follows regarding a second exemplary embodiment of a superconducting cable according to the present invention. Note that the same reference numerals are appended to configuration that is similar to that of the first exemplary embodiment, and a description thereof is omitted as appropriate.

Figure 5:
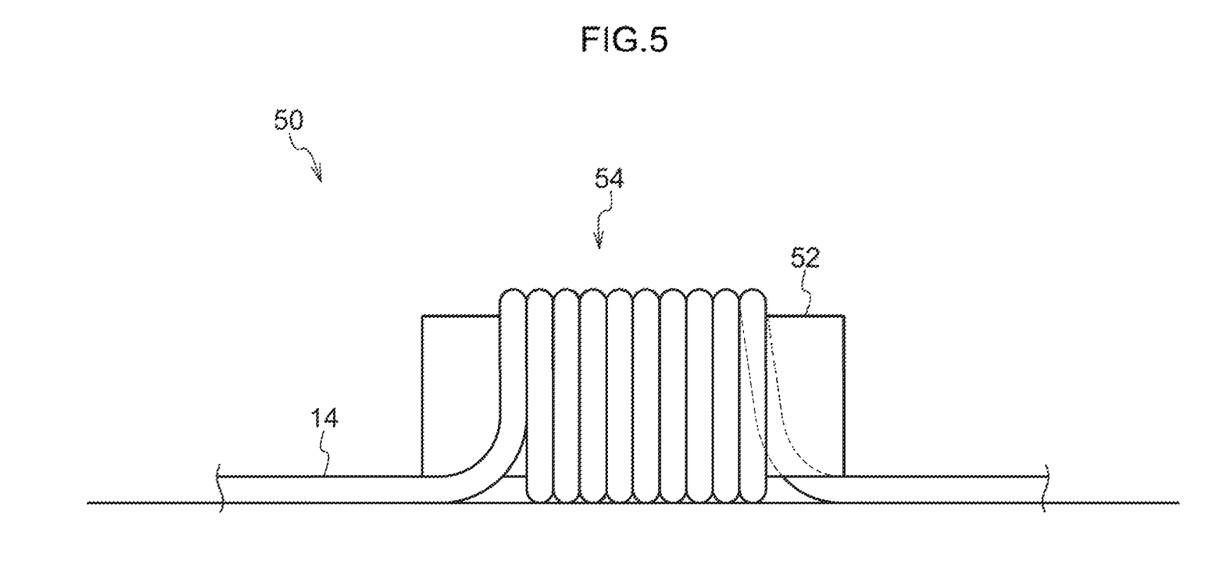
FIG. 5 is a diagram corresponding to FIG. 2, and illustrates a winding section of a superconducting cable according to a second exemplary embodiment.

A superconducting cable 50 according to the present exemplary embodiment has, as illustrated in FIG. 5, a structure of a winding section 54 differing from that of the first exemplary embodiment. More specifically, a winding frame 52 is disposed in the winding section 54, and the winding frame 52 extends in the axial direction of the superconducting cable 50. A thermal insulation vacuum tube 14 is wound in a helical shape around the outer peripheral face of the winding frame 52.

Operation and Advantageous Effects

Next, a description follows regarding operation and advantageous effects of the superconducting cable according to the present exemplary embodiment.

Figure 6:
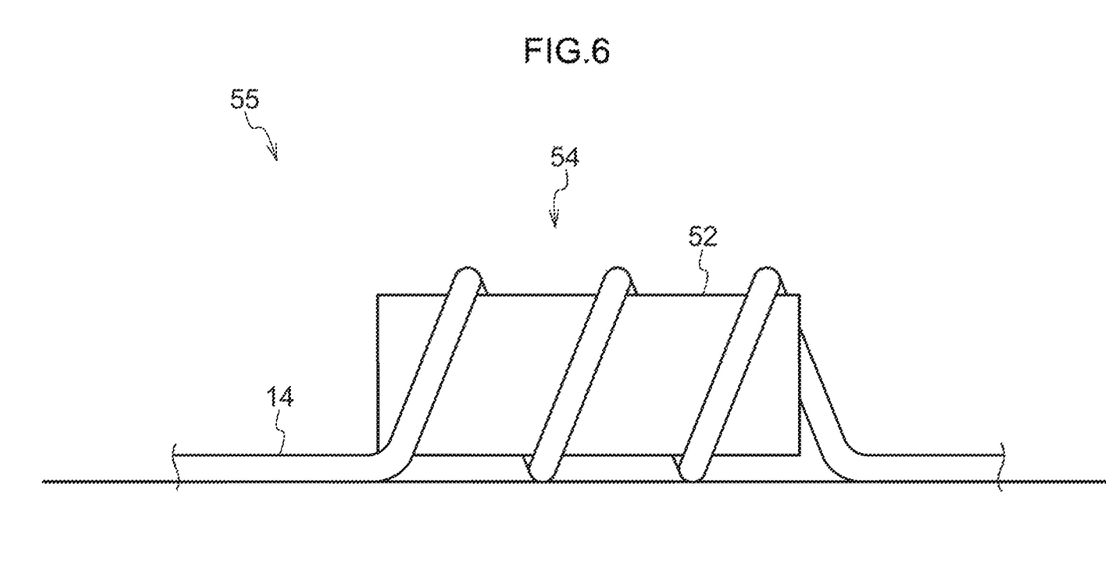
FIG. 6 is a diagram corresponding to FIG. 2, and illustrates a winding section according to a modified example of a superconducting cable according to the second exemplary embodiment.

The present exemplary embodiment has similar advantageous effects to those of the first exemplary embodiment. Moreover, due to the thermal insulation vacuum tube 14 being wound so as to form a helical shape along the laying direction of the superconducting cable 50, the length of the superconducting cable 50 required can be made shorter than that of the first exemplary embodiment in which a helical shape is wound along the up-down direction. In particular, by spacing out the superconducting cable 50 on the winding section 54 and setting a large pitch, as in a superconducting cable 55 according to a modified example as illustrated in FIG. 6, the distance to reach the cable end sections 12 (see FIG. 1) can be made shorter even in cases in which the number of turns remains the same. The cable core can also be drawn out more easily due to friction being less.

Note that in the present exemplary embodiment, due to part of the superconducting cable 50 underlying the winding frame 52, a configuration may be adopted in which support stands to support both end sections of the winding frame 52 are provided such that the superconducting cable 50 on the winding section 54 does not contact the ground.

Third Exemplary Embodiment

Next, a description follows regarding a superconducting cable 60 according to a third exemplary embodiment of the present invention. Note that the same reference numerals are appended to configuration that is similar to that of the first exemplary embodiment, and a description thereof is omitted as appropriate.

Figure 7:
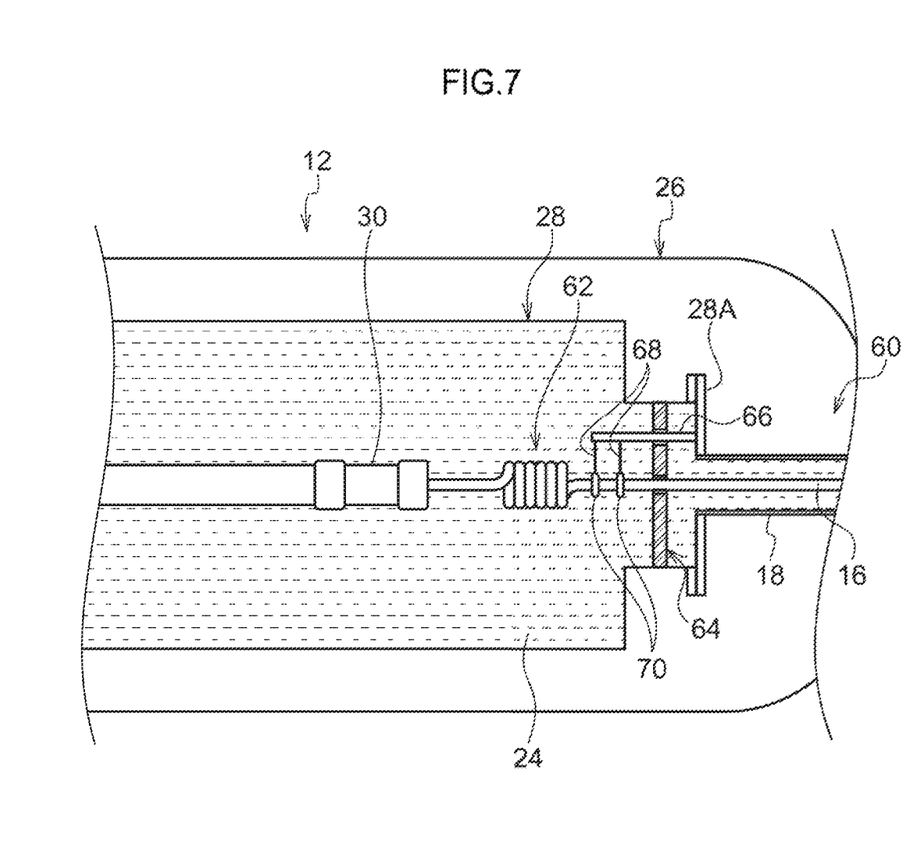
FIG. 7 is a diagram schematically illustrating a cross-section of a cable end section of a superconducting cable according to a third exemplary embodiment.

The superconducting cable 60 of the present exemplary embodiment includes a winding section 44 at a position separated from the cable end section 12, similarly to in the first exemplary embodiment (see FIG. 3). Moreover, the present exemplary embodiment differs from the first exemplary embodiment in that, as illustrated in FIG. 7, a core winding section 62 is provided in the liquid tank 28 of the cable end section 12. Detailed description follows regarding the core winding section 62.

The core winding section 62 is formed by winding a cable core 16 laid inside the liquid tank 28 in a helical shape of one or more turns. There are six turns, as an example, in the present exemplary embodiment; however, there are no particular limitations to the number of turns. There are, moreover, no particular limitations to the winding diameter of the core winding section 62. Moreover, a similar core winding section may also be provided at the other cable end section 12.

Operation and Advantageous Effects

Next, a description follows regarding operation and advantageous effects of the superconducting cable according to the present exemplary embodiment.

In the present exemplary embodiment, tensile stress acts on the cable core 16 when liquid nitrogen 24 is fed and the cable core 16 has undergone thermal contraction. The core winding section 62 extends like a tensile spring when this occurs, enabling the tensile stress to be absorbed. Moreover, when liquid nitrogen is removed and the cable core 16 has returned to normal temperature, the core winding section 62 returns under recovery force to the state it was in prior to cooling.

Figure 8:
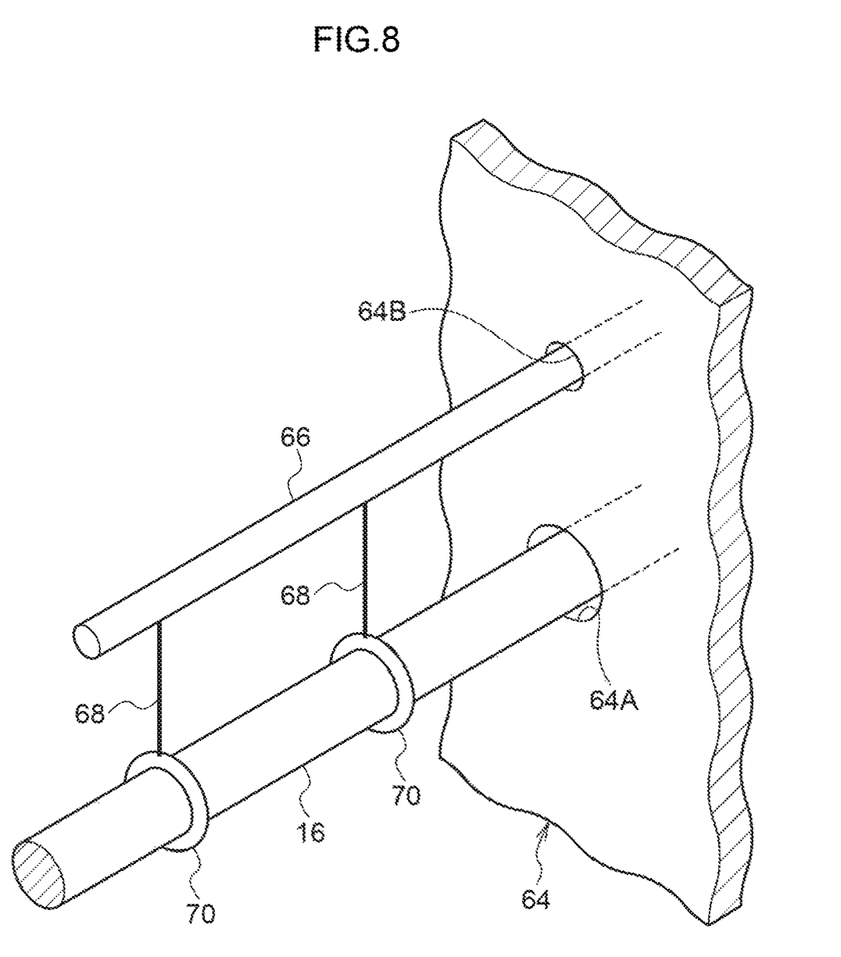
FIG. 8 is a relevant portion enlarged perspective view illustrating an enlargement of relevant portions of FIG. 7.

Note that in the present exemplary embodiment, due to recovery force being caused to act on the core winding section 62, the cable core 16 is maintained in a twisted state inside the liquid tank 28. More specifically, as illustrated in FIG. 8, a guide plate 64 is disposed further to the inlet side of the liquid tank 28 than the core winding section 62, and the cable core 16 is inserted through an insertion hole 64A formed at an up-down direction central portion of the guide plate 64.

Moreover, an insertion hole 64B is also formed above the insertion hole 64A, and a support shaft 66 is inserted through the insertion hole 64B. Plural wires 68 also extend downward from the support shaft 66. Fixing rings 70 fixed onto the outer peripheral face of the cable core 16 are attached to the leading ends of the wires 68. As illustrated in FIG. 7, one end of the support shaft 66 is fixed to a flange 28A of a liquid tank 28, so as to form a cantilever.

According to the above configuration, twisting force of the cable core 16 is transmitted from the fixing rings 70 to the support shaft 66 through the wires 68. However, the cable core 16 can be maintained in a twisted state inside the liquid tank 28 due to movement of the support shaft 66 being limited. Note that there is no limitation to the configuration of the present exemplary embodiment, and another configuration may be adopted to maintain the cable core 16 in a twisted state inside the liquid tank 28. Moreover, a configuration without the guide plate 64, the support shaft 66, or the like may be adopted in cases in which a recovery force is not required.

A description has been given above regarding superconducting cables according to the first exemplary embodiment to the third exemplary embodiment of the present invention. However, appropriate combinations of these exemplary embodiments may be employed, and obviously various modes may be implemented within a range not departing from the spirit of the present invention. For example, although liquid nitrogen is employed as the cooling medium in the above exemplary embodiments, the present invention is not limited thereto. Another cooling medium may be employed, as long as it is a cooling fluid enabling the maintenance of a superconducting state. For example, a gas such as helium gas may be employed as the cooling medium.

Moreover, although the support strands 36, 38, 49, 42 are employed in the above exemplary embodiments, as illustrated in FIG. 2, the present invention is not limited thereto. A configuration that does not employ support stands may be adopted as along as the superconducting cable is compact. There is, moreover, no particular limitations to the shape or size of any support stands.

The invention claimed is:

1. A superconducting cable, comprising:
a thermal insulation vacuum tube that includes
an inner tube fixed at both ends and having a cooling medium filled inside, and
an outer tube disposed at an outer peripheral side of the inner tube with a space between the outer tube and the inner tube maintained at a vacuum, and
a winding section of the thermal insulation vacuum tube, including the inner tube and the outer tube, is wound with one or more turns around an outer periphery of a winding frame; and
a cable core fixed at both ends and disposed inside the inner tube.

2. The superconducting cable of claim 1, wherein a diameter of the cable core is φ40 mm or less.

3. The superconducting cable of claim 1, wherein a smallest winding diameter of the winding section is a diameter of φ1 m or less.

4. The superconducting cable of claim 1, wherein a number of turns of the winding section is 20 turns or less.

5. The superconducting cable of claim 1, wherein
at least one end of the cable core is disposed in a liquid tank of cooling medium provided at a cable end section, and
the at least one end of the cable core includes a core winding section wound with one turn or more inside the liquid tank.

6. A superconducting cable, comprising:
a thermal insulation vacuum tube that includes
an inner tube fixed at both ends and having a cooling medium filled inside, and
an outer tube disposed at an outer peripheral side of the inner tube with a space between the outer tube and the inner tube maintained at a vacuum, and
a winding section of the thermal insulation vacuum tube, including the inner tube and the outer tube, is wound with one or more turns; and
a cable core fixed at both ends and disposed inside the inner tube, wherein
in a state prior to the cooling medium being filled inside the inner tube, the inner tube in the winding section is disposed eccentrically to a central axis of the outer tube in a direction away from a winding central axis of the winding section.

7. The superconducting cable of claim 6, wherein a smallest winding diameter of the winding section is a diameter of φ1 m or less.

8. The superconducting cable of claim 6, wherein a number of turns of the winding section is 20 turns or less.

9. The superconducting cable of claim 6, wherein
at least one end of the cable core is disposed in a liquid tank of cooling medium provided at a cable end section, and
the at least one end of the cable core includes a core winding section wound with one turn or more inside the liquid tank.

10. A superconducting cable, comprising:
a thermal insulation vacuum tube that includes
an inner tube fixed at both ends and having a cooling medium filled inside, and
an outer tube disposed at an outer peripheral side of the inner tube with a space between the outer tube and the inner tube maintained at a vacuum, and
a winding section of the thermal insulation vacuum tube, including the inner tube and the outer tube, is wound with one or more turns; and
a cable core fixed at both ends and disposed inside the inner tube, wherein
in a state in which the cooling medium has been filled inside the inner tube, the inner tube in the winding section is disposed eccentrically to a central axis of the outer tube in a direction to approach a winding central axis of the winding section.

11. The superconducting cable of claim 10, wherein a smallest winding diameter of the winding section is a diameter of φ1 m or less.

12. The superconducting cable of claim 10, wherein a number of turns of the winding section is 20 turns or less.

13. The superconducting cable of claim 10, wherein
at least one end of the cable core is disposed in a liquid tank of cooling medium provided at a cable end section, and
the at least one end of the cable core includes a core winding section wound with one turn or more inside the liquid tank.

14. A superconducting cable, comprising:
a thermal insulation vacuum tube that includes
an inner tube fixed at both ends and having a cooling medium filled inside, and
an outer tube disposed at an outer peripheral side of the inner tube with a space between the outer tube and the inner tube maintained at a vacuum, and
a winding section of the thermal insulation vacuum tube, including the inner tube and the outer tube, is wound with one or more turns; and
a cable core fixed at both ends and disposed inside the inner tube, wherein
in a state prior to the cooling medium being filled inside the inner tube, the cable core in the winding section is disposed eccentrically to a central axis of the inner tube in a direction away from a winding central axis of the winding section.

15. The superconducting cable of claim 14, wherein a number of turns of the winding section is 20 turns or less.

16. The superconducting cable of claim 14, wherein
at least one end of the cable core is disposed in a liquid tank of cooling medium provided at a cable end section, and
the at least one end of the cable core includes a core winding section wound with one turn or more inside the liquid tank.

17. A superconducting cable, comprising:
a thermal insulation vacuum tube that includes
an inner tube fixed at both ends and having a cooling medium filled inside, and
an outer tube disposed at an outer peripheral side of the inner tube with a space between the outer tube and the inner tube maintained at a vacuum, and
a winding section of the thermal insulation vacuum tube, including the inner tube and the outer tube, is wound with one or more turns; and
a cable core fixed at both ends and disposed inside the inner tube, wherein
in a state in which the cooling medium has been filled inside the inner tube, the cable core in the winding section is disposed eccentrically to a central axis of the inner tube in a direction to approach a winding central axis of the winding section.

18. The superconducting cable of claim 17, wherein a number of turns of the winding section is 20 turns or less.

19. The superconducting cable of claim 17, wherein
at least one end of the cable core is disposed in a liquid tank of cooling medium provided at a cable end section, and
the at least one end of the cable core includes a core winding section wound with one turn or more inside the liquid tank.

20. A superconducting cable manufacturing method of manufacturing a superconducting cable, the method comprising:
a cable laying process of, between a pair of cable end sections, laying a cable core, an inner tube that is disposed at an outer peripheral side of the cable core, and an outer tube that is disposed at an outer peripheral side of the inner tube and that has a space between the outer tube and the inner tube maintained at a vacuum;
a winding process of winding one turn or more of the cable core, the inner tube, and the outer tube onto a winding frame; and
a cooling medium feed process of flowing the cooling medium inside the inner tube in a state in which both ends of the cable core, the inner tube, and the outer tube are fixed to the cable end sections, wherein
in the cooling medium feed process, in a state prior to flowing the cooling medium flowing inside the inner tube, the inner tube is disposed eccentrically to a central axis of the outer tube in a direction away from a winding central axis, and the cable core is disposed eccentrically to a central axis of the inner tube in a direction away from the winding central axis.

* * * * *